Dec. 20, 1966 D. M. MOTL 3,292,428
TEST INSTRUMENT FOR A PUMP

Filed July 15, 1965 3 Sheets-Sheet 1

INVENTOR.
DANIEL M. MOTL
BY Frederick E. Lange
ATTORNEY

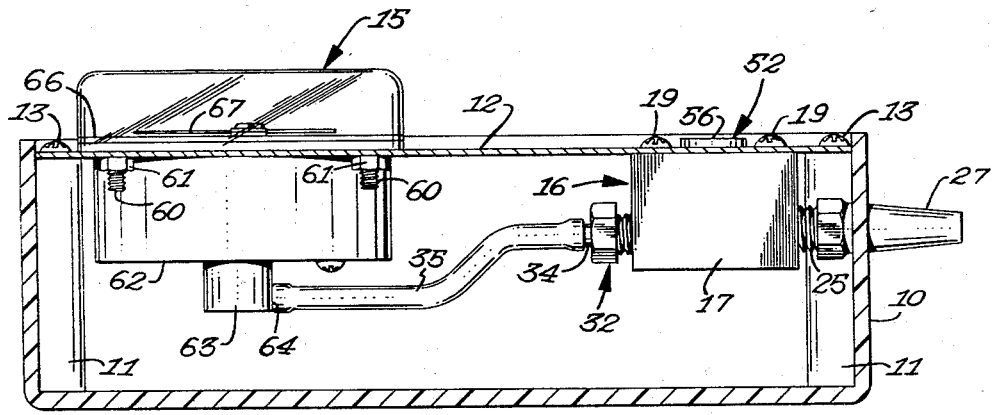
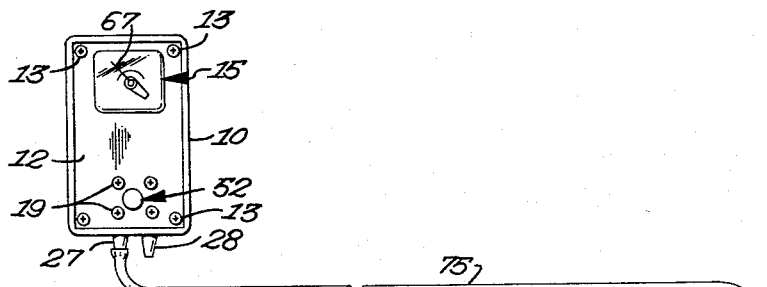
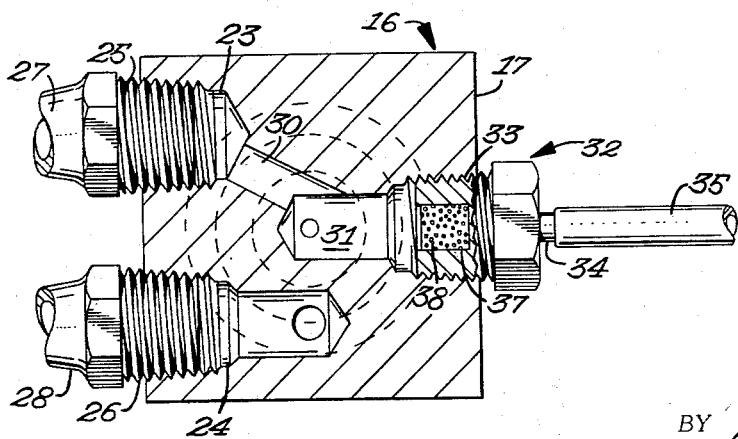

Dec. 20, 1966 D. M. MOTL 3,292,428
TEST INSTRUMENT FOR A PUMP
Filed July 15, 1965 3 Sheets-Sheet 3

INVENTOR.
DANIEL M. MOTL
BY Frederick E. Lange
ATTORNEY

United States Patent Office 3,292,428
Patented Dec. 20, 1966

3,292,428
TEST INSTRUMENT FOR A PUMP
Daniel M. Motl, St. Louis Park, Minn., assignor to Marquette Corporation, Minneapolis, Minn., a corporation of Delaware
Filed July 15, 1965, Ser. No. 477,072
13 Claims. (Cl. 73—118)

This application is a continuation-in-part of my copending application Serial No. 383,607 filed July 20, 1964 now abandoned.

The present invention relates to a test instrument for a pump and more particularly one designed to be used with a pump which pulsates in operation such as an automobile fuel pump. In testing a pump, it is desirable to test at least the pump outlet pressure and the liquid flow and in many cases it is also desirable to test the vacuum produced by the pump. In some of the prior art arrangements, this has been accomplished by providing a plurality of gauges which are selectively used depending upon whether it is desired to check for pump pressure, liquid flow, or the vacuum produced by the fuel pump. Furthermore, some of these prior art arrangements have been quite complicated to use and it is highly desirable to reduce the work of the mechanic to a minimum necessary to give an accurate reading.

It is accordingly an object of my invention to provide a very simple pump test instrument employing merely one gauge with means for selectively causing the gauge to indicate either pump outlet pressure or liquid flow.

A still further object of the invention is to provide such a device having a very simple valve for selecting whether the gauge indicates pump pressure or flow.

A still further object of my invention is to provide such a device in which the gauge is also calibrated to indicate the vacuum produced by the pump and in which means are provided for connecting the gauge to the pump to indicate vacuum.

A still further object of my invention is to develop such a device which is capable of testing a fuel pump while the fuel pump is being operated by the engine.

A still further object of my invention is to provide an arrangement in which the entire test instrument is mounted in a relatively small casing which is convenient to handle.

A still further object of my invention is to provide such an instrument in which the gauge and the valve actuator are both located on the front panel of the instrument and in which the instrument can be readily assembled.

A still further object of my invention is to provide such a device in which the reading of the gauge is relatively stable when used to test a fuel pump despite the fluctuations of the fuel pump due to the pulsating manner in which it is operated by the engine.

Other objects of my invention will be apparent from a consideration of the accompanying specification, claims and drawing in which:

FIGURE 4 is a section taken along the line 4—4 of FIGURE 3 showing this valve housing in section along a different sectional plane;

FIGURE 5 is a vertical sectional view taken along the line 5—5 of FIGURE 1;

FIGURE 6 is a view showing my test device connected to the intake side of an automobile fuel pump for measuring vacuum;

Figure 1:
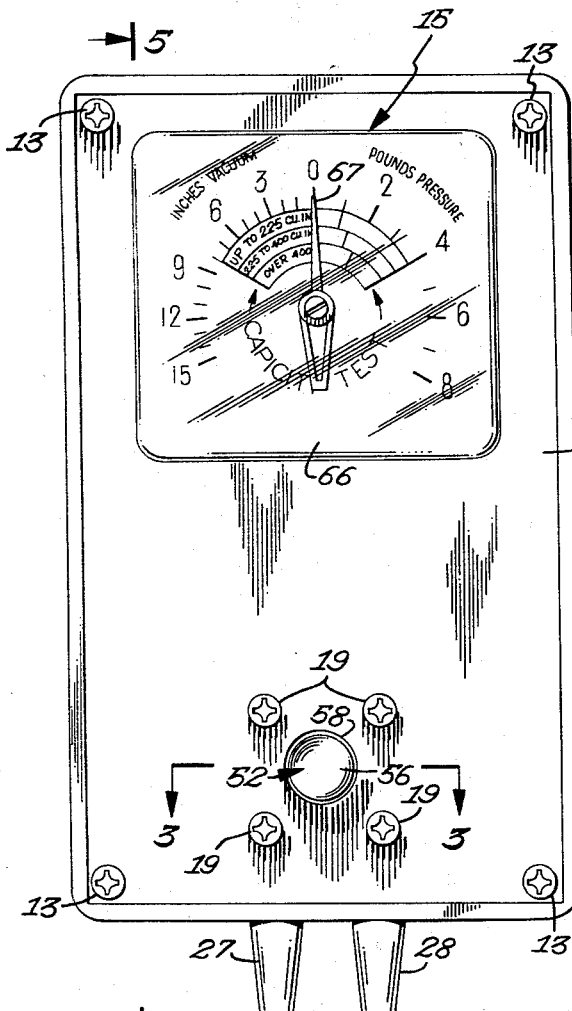
FIGURE 1 is a front elevational view of my improved pump test instrument.

Referring first to FIGURE 1, my instrument is housed in a casing 10. As best indicated in FIGURE 5, the casing is rectangular in form having an open front. Also, referring to FIGURE 5, the casing 10 is provided with a plurality of internal posts 11 which are tapped at the upper end to receive screws.

Secured to the front of casing 10 is a panel 12. As shown in FIGURE 5, this panel is fastened to the casing member 10 by a plurality of screws 13 which extend through the front of panel member 12 and into the posts 11. A gauge 15 is fastened to the front panel 12 by means to be described later.

Figure 3:
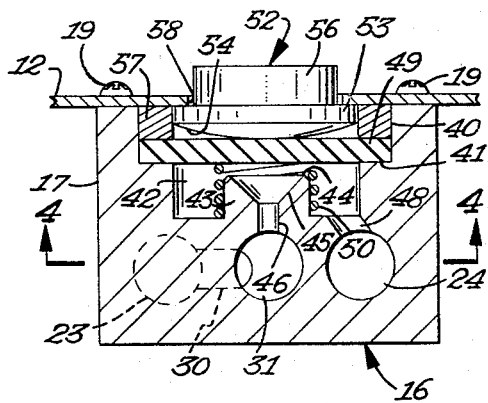
FIGURE 3 is a sectional view taken along the lines 3—3 of FIGURE 1 and showing in section the valve housing of my device.
Figure 7:
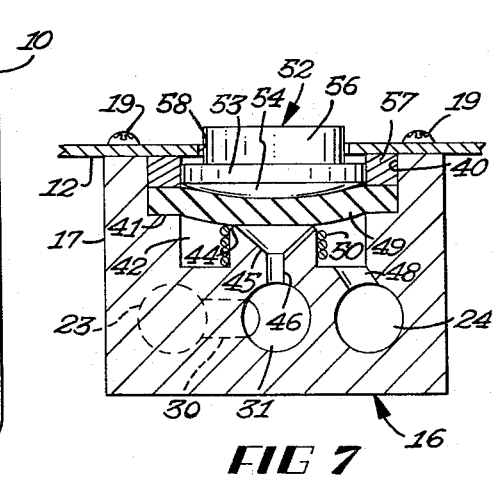
FIGURE 7 is a sectional view similar to that of FIGURE 3 but with the manually operable valve closed to indicate pressure or, in the arrangement of FIGURE 6, vacuum.

Also secured to the panel 12 is a valve housing 16 shown in section in FIGURES 3, 4 and 7 and shown in a side elevational view in FIGURE 5. This valve housing consists of a block 17 which is secured to the front panel 12 by a plurality of screws 19.

As best shown in FIGURE 4, block 17 is provided with two parallel bores 23 and 24 into which are threaded fittings 25 and 26, respectively. The outer ends of these fittings are provided with nipples 27 and 28 adapted to receive the ends of hoses made of a suitable fuel-resistant elastic material such as neoprene. The shape of these nipples is best shown in FIGURE 1. These nipples project through suitable openings in the casing 10 when the valve housing 16 is secured in place, as best shown in FIGURE 5. The bore 23 communicates through a diagonal passage 30 with a central passage 31 which, as shown in FIGURE 4, is tapped at its outer end to receive a fitting 32 having a screw-threaded shank portion 33 and an outwardly extending nipple 34 to which is secured a hose 35. Located within the screw-threaded shank portion 33 is a recess 37 in which is mounted a plug 38 of porous material such as sintered bronze. The hose 35 fitting over nipple 34 extends to the gauge 15 as will be referred to later.

The portion of block 17 facing the panel 12 is bored to provide a plurality of cavities in which is mounted the valve assembly. In the first place, there is a large annular recess 40, the annular inner edge of which constitutes a shoulder 41. Communicating with the passage 40 is a smaller passage or recess 42 of annular form in the center of which there is a stud portion 43, the upper end of which provides an annular valve seat 44. This valve seat 44 communicates through a conical opening 45 and a restricted opening 46 with the central passage 31 which, as previously recited, communicates on the one hand with bore 23 constituting the inlet passage and on the other hand with the hose 35 leading to the gauge. The annular cavity 42 surrounding the valve seat 44 communicates through a relatively large passage 48 with the bore 24 which, as will be apparaent from the later descriptions, constitutes the outlet passage.

Mounted on the shoulder 41 is a circular disc 49 which may be of any suitable oil-resistant elastic material, such as neoprene or the like. A spring 50 surrounds the stud 43 and bears at one end against the bottom of the annular recess 42 and at its upper end against the underside of the diaphragm 49.

The diaphragm 49, as will be presently discussed, is adapted to bear against the valve seat 44 to interrupt flow of fluid from passage 31 to passage 24. The spring 50 is provided for aiding the natural bias of the resilient material 49 to insure that this material is normally not in engagement with valve seat 44.

A valve actuator 52 has a circular inner portion 53 whose inner surface is curved as shown at 54 to engage the outer surface of diaphragm 49. The valve actuator 52 is further provided with a button portion 56 which projects out through an opening 58 in the panel 12. As best shown in FIGURE 7, when button 56 is pressed inwardly, the diaphragm 49 is moved against the biasing action of spring 50 to bring the diaphragm 49 into engagement with the valve seat 44. As soon as the button 56 is released, the combined action of the biasing effect of diaphragm 49 and spring 50 forces the diaphragm 49 outwardly back to the position shown in FIGURE 3 where the diaphragm 49 is disengaged from the valve seat 44.

A ring 57 is interposed between the panel 12 and the outer annular edge of the valve diaphragm 49. The function of ring 57 is to maintain the diaphragm clamped in position when the valve housing block 17 is secured to the panel.

A gauge 15, as previously noted, is likewise secured to the front panel 12. This gauge, as best shown in FIGURE 5, is provided with a plurality of screw-threaded studs 60 which project through the panel 12 and have nuts 61 secured thereto to retain the gauge clamped to the panel. The gauge has an inner housing 62 which houses a suitable pressure responsive device. Extending from this housing 62 is an apertured boss 63 provided with an inlet fitting 64. The hose 35 previously referred to, which is secured to the nipple 34 of fitting 32, extends between nipple 34 and nipple 64 of the gauge and serves to transmit the fuel pressure existing in passage 31 to the pressure responsive mechanism of the gauge.

The gauge is provided with a dial 66 which cooperates with a pointer 67 driven by the pressure responsive element within housing 62. It will be noted from FIGURE 1 that on the right-hand side of the zero point, the scale is calibrated in terms of pounds pressure. On the left-hand side, the gauge is calibrated in terms of inches of vacuum. When pressure is applied to the pressure responsive element within housing 62, the pointer moves to the right as viewed in FIGURE 1. When a vacuum is applied to this pressure responsive element, the pointer 67 moves to the left.

In addition to the calibrations indicating pounds of pressure and inches of vacuum, the meter 15 is also provided with three annular bands. On the right-hand side of the zero position, each annular band is divided into two sections. These annular bands are designed to indicate whether there is proper flow of liquid from the pump. It will be noted from the indicia appearing in the drawing that the outermost band is used for engines of up to 225 cubic inches piston displacement, the intermediate band for engines of from 225 to 400 cubic inches displacement, and the inner band for engines of over 400 cubic inches displacement. Depending upon the particular type of engine being tested, the appropriate band is observed. Where there is adequate flow of fuel, the pointer moves into the appropriate segment spaced furthest from the zero point. When the pointer does not pass the dividing line between the two segments of the appropriate band, inadequate delivery of fuel is indicated.

*Operation of device of FIGURES 1 to 7*

Figure 2:
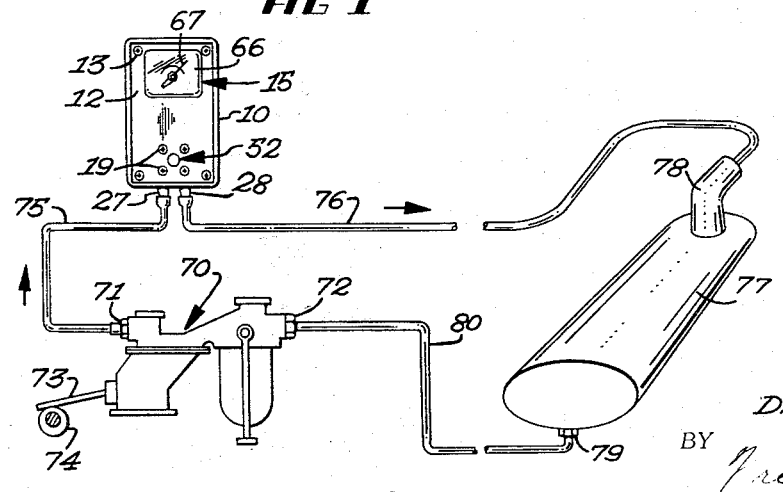
FIGURE 2 is a view showing the test instrument connected to an automobile fuel pump and to the fuel tank supplying the engine.

Referring now to FIGURE 2, I have shown my improved device as applied to testing the operation of a fuel pump of an internal combustion engine. The fuel pump is generally indicated by the reference numeral 70 and has an outlet connection 71 and an inlet connection 72. The pump 70 is of conventional construction having an arm 73 engaging a cam 74 driven by the engine. When the engine is operated the arm 73 is reciprocated to operate the pump. In one typical type of pump, this arm 73 operates a diaphragm which constitutes a movable element of the pump.

The numeral 77 is used to indicate a conventional fuel tank of an automobile, this fuel tank having a filler pipe 78 and an outlet 79. A conduit 80 extends from the outlet 79 of the fuel tank to the inlet 72 of the fuel pump.

When it is desired to test the operation of the fuel pump, the conventional conduit leading from the outlet to the fuel pump is disconnected and a flexible hose 75 is connected to this outlet by a suitable fitting. The opposite end of this hose is placed over the fitting 27. A further flexible hose 76 is connected to the other fitting 28 and extends back to the filler pipe 78 of the fuel tank 77. The engine is now started. While the fuel pump is disconnected from the carburetor under these conditions, the carburetor retains a fair amount of fuel making it possible to run the engine for a period of time long enough to conduct the test. If this fuel supply is exhausted before the test is completed, it is always possible to add more fuel to the carburetor through the air intake opening.

With button 52 in the position shown in FIGURE 3, that is the position in which diaphragm 49 is not in engagement with the valve seat 44, the fuel passing from the fuel pump outlet 71 through hose 75 into nipple 27 flows through passage 23, the diagonal passage 30, the central passage 31, the restricted passage 46, the annular recess 42, the diagonal passage 48, the outlet passage 24, and back through nipple 28 and hose 76 to the filler pipe 78. The restricted passage 46 functions as an orifice causing a partial loss in the pressure of the fuel as it flows through this passage. To a lesser extent, the other passages, hose 76, and fittings through which the fuel returns to the tank, cause a further drop in pressure. Since the interior of the tank 77 is open to atmospheric pressure, the gauge 15, which is connected to the passage 31, provides a direct indication of the total pressure drop caused by passage 46 and by the other passages, hose and fittings between passage 46 and tank 77. Assuming that the viscosity and the specific gravity of the fuel remain fairly constant, this total pressure drop is a direct function of the rate of fuel flow. Therefore, the deflection of the pointer 67 to the right of the zero position of gauge 15 provides an indication of the rate of flow. However, to simplify the calibration of the device and to facilitate interpretation of the results by the mechanic, the dial 66 does not show the rate of flow in numerical units. Instead, as previously noted, three annular bands are provided corresponding to various ranges of engine displacement. By observing the position of pointer 67 in the inner or outer segment of the appropriate band, the mechanic can quickly determine whether or not the rate of flow is adequate. As previously pointed out, the pointer 67 should deflect to the right sufficiently to be in the outer of the two segments of the band appropriate to the particular capacity of engine being tested. If the pointer 67 does not deflect this far, the pump is normally not delivering an adequate amount of fuel.

After the mechanic has finished checking whether the fuel flow is adequate, he presses the button 52 to move the diaphragm 49 into the position shown in FIGURE 7. Under these conditions, no fuel can pass from passage 31 to the outlet passage 24. All flow from the pump is thereby shut off and the pressure in passage 31 builds up to the maximum value which the pump is capable of developing under this condition. If the pump is operating properly, the pointer should move to a point beyond four pounds pressure, which is beyond the range of the scale in which the flow measurements are taken.

With this apparatus it is thus possible quickly to check first fuel flow and then fuel pressure. Furthermore, during this operation no fuel is being discharged into the open. The fuel being measured passes back through flexible conduits 76 into the fuel tank.

In checking vacuum, fuel pump 70 is again connected to the carburetor by restoring the usual conduit 83 between the fuel pump outlet 71 and the carburetor. At the same time, the flexible hose 75 attached to the inlet nipple 27 is connected to the fuel pump inlet 72 as shown in FIGURE 6. Since no fuel is being supplied to the test instrument, it is unnecessary to connect the instrument 28 to the filler pipe 78 as shown in FIGURE 2, although the presence of this hose 76, if still so connected, presents no disadvantage.

Again, when checking vacuum, the engine is run with the fuel remaining in the carburetor. The button 52 is depressed to bring the diaphragm 49 into engagement with the valve seat 44. Under these conditions, a vacuum is built up in the passage 31 which vacuum is communicated through the flexible hose 35 to the pressure responsive portion of the meter 15. As previously pointed out, the application of a vacuum to this pressure responsive mechanism causes gauge pointer 67 to deflect to the left. The left-hand side of the scale is calibrated in inches of vacuum and it is possible for the operator to readily determine the suction being exerted by the pump. The device can also be used to measure intake vacuum by connecting hose 75 to a suitable fitting on the intake manifold such as that used to connect the windshield wiper motor.

When the vacuum test is completed, the button 52 is released. The spring 50 is effective at this time to force the diaphragm 49 away from valve seat 44 against the force of the vacuum being exerted.

Regardless of whether the apparatus is being used to measure fuel flow, pump pressure, or vacuum, the porous plug 38 is effective to dampen out pulsations in the pressure, flow, or vacuum arising from the pulsating operation of the pump. Without such a dampening device, the pointer 67 would fluctuate violently, making it very difficult to obtain a reading of any value and also tending to damage the gauge. Similarly, the porous plug is effective to dampen out the pulsations in the intake manifold vacuum, where the device is being used to measure intake manifold vacuum, particularly at low engine needs. The use of a porous metal plug is very desirable in that such a plug provides the correct amount of dampening which remains relatively constant in use. Furthermore, there is no danger of foreign material being introduced in the fuel such as might happen if a fibrous plug were employed. If desired, it is also possible to use a porous plastic plug.

Figure 8:
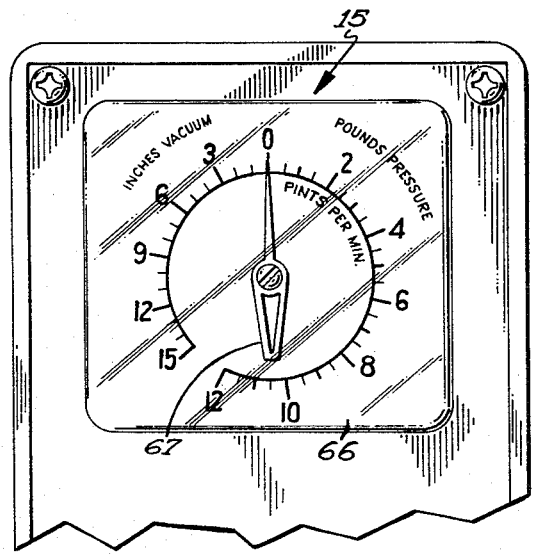
FIGURE 8 is a front elevational view showing a portion of a modification of my pump test instrument.

*Modification of FIGURE 8*

In the species previously described, a plurality of colored bands are used for indicating fuel flow. In the modification of FIGURE 8, the same indicia are employed for indicating both pressure in pounds per square inch and fuel flow in pints per minute. By proper selection of the size of the restricted opening 46, I have found that it is possible, in the case of almost all automobile engines, to have the numerals on the righthand side of the scale apply equally to pressure in pounds per square inch and fuel flow in pints per minute. Thus, when button 52 is in its normal position as shown in FIGURE 3, the pointer 67 deflects to the right by an amount indicating the fuel flow in pints per minute. When the button 52 is depressed to the position shown in FIGURE 7, the deflection of the gauge indicates the pressure in pounds per square inch. Because of the proper selection of the restriction 46, the numerals appearing in the scale are equally applicable for both pounds of pressure when the button 52 is depressed, and fuel flow in pints per minute when the button is in its normal position. Thus, with the modification of FIGURE 8, it is possible to employ a single scale to give numerical values of both pressure and flow.

The gauge indication of fuel flow in pints per minute is so calibrated that it is not an indication of the flow actually taking place through restriction 46, but rather, an indication of what the fuel pump would deliver if its outlet were not subject to any restriction. It is the latter indication which it is important to obtain, since the conventional measure of the fuel flow capacity of a fuel pump is the amount of fuel which it would deliver if the outlet were completely disconnected from any restrictive device.

In the modification of FIGURE 8, the scale on the righthand side has also been extended to take care of even higher fuel pump pressures. It is to be understood, of course, that the particular numerals shown are merely illustrative and that the invention is in no way limited to any particular values of numerals employed.

Figure 9:
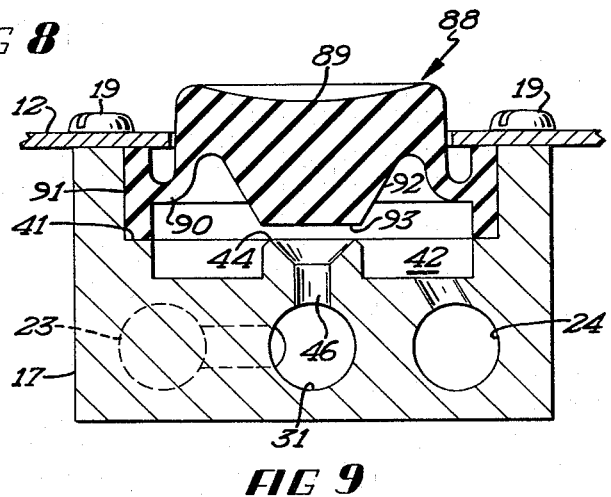
FIGURE 9 is a sectional view similar to FIGURE 3 but showing a modification employing a different form of valve means.
Figure 10:
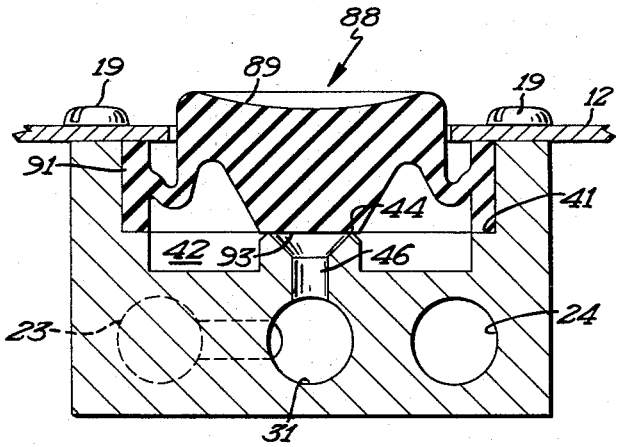
FIGURE 10 is a view similar to FIGURE 7 but employing the modified form of valve means shown in FIGURE 9.

*Modification of FIGURES 9 and 10*

In the form of the device shown in section in FIGURES 3 and 7, the manually operable valve assembly included the valve actuator 52, the diaphragm 49, the spacer ring 57 and the biasing spring 50. In the modification of FIGURES 9 and 10, these four units are replaced by a single molded unit 88 formed of a suitable flexible gasoline-resistant material, such as BUNA-N synthetic rubber. This molded unit 88, which is shown in its normal position in FIGURE 9, comprises a button portion 89, a diaphragm portion 90 and an outer cylindrical flange portion 91. The flange portion 91 has an overall height slightly greater than the distance between shoulder 41 and panel member 12, so that when the unit 88 is placed in position on shoulder 41 and the valve housing block 17 is secured to panel member 12 by screws 19, the unit 88 is clamped firmly in position and a liquid tight seal is formed between flange 91 and shoulder 41. The button portion 89 has an inwardly directed frustro-conical portion 92 terminating at its lower end in a flat base 93 which is adapted to engage the valve seat 44 and is somewhat larger in diameter than valve seat 44.

Since the valve housing block 17 is essentially the same as in the previously described forms of my invention, I have used the same reference characters in describing the valve housing block as were employed in connection with FIGURES 1 through 7.

The knob 89 is normally biased to the position shown in FIGURE 9 by the diaphragm portion 90. When the button portion 89 is pushed inwardly, to measure pressure or vacuum, the diaphragm portion 90 is flexed and the lower flat face 93 is moved into engagement with the valve seat 44 as shown in FIGURE 10. This effectively blocks the flow of fluid between the inlet bore 23 and the outlet bore 24, as described previously in connection with the operation of the species of FIGURES 1 to 7.

The overall operation of the test instrument of FIGURES 9 and 10 is exactly the same as that of the species of FIGURES 1 through 7. The only difference between the species of FIGURES 9 and 10 and that previously described is in the substitution of the unitary member 88 for the valve actuator member 52, spacer ring 57, diaphragm 41 and the biasing spring 50. It is apparent that this single unitary member 88 performs the function of these four members.

*Conclusion*

It will be seen that I have provided an extremely simple apparatus for determining the pump pressure, the pump flow and the vacuum exerted by the pump. Such a device is particularly suitable for testing the fuel pump of an internal combustion engine although it may be employed in connection with pumps of other types.

While I have shown certain specific embodiments of my invention, it is to be understood that this is for purposes

I claim as my invention:

1. A test instrument for a fuel pump for an internal combustion engine, said instrument comprising:
a casing having a single pressure responsive gauge calibrated to indicate either fuel pump pressure or fuel flow,
said casing having a first inlet passage connected to said gauge and adapted to be connected to the outlet of a fuel pump to be tested,
and said casing having an outlet passage adapted to be connected to an area at substantially atmospheric pressure and connected to said first passage through a fixed restriction and a manually operable valve in series with each other, the size of the restriction being so related to the calibrations of fuel flow on said pressure gauge that when said manually operable valve is open, said gauge indicates the amount of fuel flow,
said instrument being effective when said manually operable valve is closed to prevent passage of fuel to said outlet passage to cause the pressure in said inlet passage and hence that applied to said gauge to assume pump outlet pressure to cause said gauge to indicate pump outlet pressure.

2. The test instrument of claim 1 in which said manually operable valve is biased to open position and can be held in close position against its bias by a manual operator projecting through an opening in said casing.

3. The test instrument of claim 1 in which said manually operable valve includes a diaphragm biased away from a valve seat associated therewith and which is movable into engagement with said valve seat by a button type actuator bearing against said diaphragm and having an actuating button projecting through an opening in said casing.

4. The test instrument of claim 1 in which said manually operable valve is in the form of a resilient diaphragm having an integral valve seat engaging portion projecting inwardly from said diaphragm and an actuating button projecting outwardly from said diaphragm, said diaphragm having sufficient resiliency and the movement of said valve seat portion being sufficiently limited that the diaphragm is effective to move said valve seat engaging portion away from the valve seat whenever said button is released.

5. The test instrument of claim 1 in which the size of said restriction is such that the same indicia on said gauge indicate units of pressure and units of the fuel flow which would occur if the passage from the outlet of the pump were unrestricted.

6. The test instrument of claim 1 in which said pressure responsive gauge is also calibrated to read vacuum and in which when said first passage is connected to a source of vacuum such as the inlet of a fuel pump to be tested or an intake manifold of an internal combustion engine and when said valve is closed, said gauge indicates the vacuum existing at said source of vacuum.

7. The test instrument of claim 1 in which dampening means is associated with the connection of said first inlet passage to said gauge to dampen out pulsations in pressures arising from the pulsating operation of said fuel pump.

8. The test instrument of claim 1 in which a porous member is associated with the connection of said first inlet passage to said gauge to dampen out pulsations in pressures arising from the pulsating operation of said fuel pump.

9. The test instrument of claim 1 in which said outlet passage terminates in a fitting adapted to receive one end of a flexible conduit of sufficient length to return to the engine fuel tank the fuel passing through said test instrument.

10. A test instrument for a pump, said instrument comprising:
a casing member,
a front panel secured to and closing said casing member,
a pressure responsive gauge supported by said panel and having a dial and pointer visible from the front of said panel,
said dial and pointer being calibrated to indicate either pump pressure or liquid flow,
and a valve housing secured to said panel within said casing member,
said valve housing having a first inlet passage communicating with a fitting extending through said casing member and adapted to be connected to the outlet of a pump to be tested,
a conduit member connecting said first passage with said gauge,
and said valve housing an outlet passage adapted to be connected to an area at substantially atmospheric pressure and connected to said first passage through a restriction and a manually operable valve in series with each other, the size of the restriction being so related to the calibrations of fuel flow on said gauge that when said manually operated valve is open, said valve indicates the amount of liquid flow;
said instrument being effective when said manually operable valve is closed to prevent passage of liquid to said outlet passage to cause the pressure in said inlet passage and hence that applied to said gauge to assume pump outlet pressure to cause said gauge to indicate pump outlet pressure.

11. The test instrument of claim 10 in which said manually operable valve includes a diaphragm in said valve housing normally biased away from a valve seat within said valve housing and which is movable into engagement with said valve seat by a button type actuator bearing against said diaphragm and having an actuating button projecting through said panel.

12. The test instrument of claim 10 in which said manually operable valve includes a diaphragm in said valve housing normally biased away from a valve seat within said valve housing and parallel to said front panel and which is movable into engagement with said valve seat by a button type actuator projecting from said diaphragm and projecting through said panel, a spacer member disposed between said panel and the outer edge of said diaphragm, and fastening means for detachably securing said valve housing to said panel and clamping said diaphragm in position through said spacer member.

13. The test instrument of claim 10 in which said pressure responsive gauge is also calibrated to read vacuum and in which when said first inlet passage is connected to a source of vacuum such as the inlet of a pump to be tested or an intake manifold of an internal combustion engine so that when said valve is closed to interrupt the connection between said inlet and outlet passages, said gauge indicates the vacuum existing at said source of vacuum.

References Cited by the Examiner

UNITED STATES PATENTS

| | | | |
|---|---|---|---|
| 2,515,394 | 7/1952 | Clarkson | 73—392 |
| 2,701,968 | 2/1955 | Brown | 73—205 |
| 2,720,782 | 10/1955 | Stein | 73—118 |
| 2,859,611 | 11/1958 | Morse | 73—168 |
| 2,924,971 | 2/1960 | Schroder et al. | 73—168 |
| 3,208,721 | 9/1965 | McHugh | 251—331 |

DAVID SCHONBERG, *Primary Examiner.*

LOUIS R. PRINCE, *Examiner.*

MICHAEL B. HEPPS, *Assistant Examiner.*